US008526017B2

(12) United States Patent
Tanaka et al.

(10) Patent No.: US 8,526,017 B2

(45) Date of Patent: Sep. 3, 2013

(54) IMAGE EDITING APPARATUS, IMAGE EDITING METHOD, AND PRINTING APPARATUS

(75) Inventors: Seiji Tanaka, Azumino (JP); Takayuki Uehara, Kashigaya (JP)

(73) Assignee: Seiko Epson Corporation, Tokyo (JP)

( * ) Notice: Subject to any disclaimer, the term of this patent is extended or adjusted under 35 U.S.C. 154(b) by 1340 days.

(21) Appl. No.: 11/468,492

(22) Filed: Aug. 30, 2006

(65) Prior Publication Data

US 2007/0201069 A1 Aug. 30, 2007

(30) Foreign Application Priority Data

Sep. 12, 2005 (JP) ................................ 2005-264174

(51) Int. Cl.

| | |
|---|---|
| ***G06F 3/12*** | (2006.01) |
| ***G06F 3/14*** | (2006.01) |
| ***G06F 17/28*** | (2006.01) |
| ***G06K 15/02*** | (2006.01) |
| ***H04N 1/387*** | (2006.01) |

(52) U.S. Cl.

USPC .......... 358/1.13; 358/401; 358/452; 358/453; 358/501; 358/1.16; 358/1.18; 704/2; 704/5

(58) Field of Classification Search

USPC ............... 358/452, 453, 501, 1.13, 1.16, 1.18

See application file for complete search history.

(56) References Cited

U.S. PATENT DOCUMENTS

| | | | | |
|---|---|---|---|---|
| 4,373,192 | A * | 2/1983 | Yanagiuchi et al. | 704/6 |
| 4,412,305 | A * | 10/1983 | Yoshida | 704/4 |
| 4,482,981 | A * | 11/1984 | Morimoto et al. | 704/3 |
| 4,542,478 | A * | 9/1985 | Hashimoto et al. | 704/6 |
| 5,136,504 | A * | 8/1992 | Fushimoto | 704/10 |
| 5,136,505 | A * | 8/1992 | Inamori et al. | 704/4 |
| 5,210,853 | A * | 5/1993 | Nakasuji et al. | 1/1 |
| 5,214,583 | A * | 5/1993 | Miike et al. | 704/4 |
| 5,523,946 | A * | 6/1996 | Kaplan et al. | 704/2 |
| 5,541,837 | A * | 7/1996 | Fushimoto | 704/2 |
| 5,612,872 | A * | 3/1997 | Fujita | 704/2 |
| 5,795,086 | A * | 8/1998 | Watanabe et al. | 400/615.2 |
| 5,868,576 | A * | 2/1999 | Maruta | 434/157 |
| 6,282,315 | B1 * | 8/2001 | Boyer | 382/177 |
| 7,195,409 | B2 | 3/2007 | Horii et al. | |
| 2002/0193986 | A1 * | 12/2002 | Schirris | 704/8 |
| 2003/0187681 | A1 * | 10/2003 | Spain | 705/1 |
| 2005/0111651 | A1 * | 5/2005 | Chavez et al. | 379/265.01 |
| 2005/0137844 | A1 * | 6/2005 | Voruganti | 704/2 |
| 2005/0137879 | A1 * | 6/2005 | Juang et al. | 704/276 |

FOREIGN PATENT DOCUMENTS

| | | | |
|---|---|---|---|
| JP | 07-146858 | * | 6/1995 |
| JP | 07200605 | A * | 8/1995 |
| JP | 2005-100352 | | 4/2005 |
| KR | 1020050078516 | | 8/2005 |
| WO | 09-167157 | A | 6/1997 |

* cited by examiner

*Primary Examiner* — King Poon

*Assistant Examiner* — Beniyam Menberu

(74) *Attorney, Agent, or Firm* — DLA Piper LLP (US)

(57) ABSTRACT

An image editing apparatus edits on an image editing screen a printing image to be printed on a printing medium. The printing image is arranged by a plurality of translated terms of at least one term represented by a plurality of languages. The apparatus stores therein plural sets of the plurality of translated terms, selects one set of the translated terms out of the plural sets of the translated terms, displays on the image editing screen the selected one set of the translated terms as a printing block, where addition and deletion of a letter are prohibited, on a translated term-by-translated term basis, and designates an editing input position of the printing block on the image editing screen.

12 Claims, 9 Drawing Sheets

IMAGE EDITING APPARATUS, IMAGE EDITING METHOD, AND PRINTING APPARATUS

The entire disclosure of Japanese Patent Application No. 2005-264174, filed Sep. 12, 2005, is expressly incorporated by reference herein.

BACKGROUND

1. Technical Field

The present invention relates to an image editing apparatus, an image editing method, and a printing apparatus for editing a printing image to be printed on a printing medium.

2. Related Art

Conventionally, there is known a printing apparatus for printing on a printing medium (e.g., a printing tape) a printing image arranged by a plurality of translated terms (e.g., "satou" (the Japanese term for sugar), sugar, zuker) of at least one term represented by a plurality of languages (e.g., in Japanese, English, German in the above example). JP A-2005-100352 (FIGS. 8A and 8B) is an example of related art.

If an arrangement is made to enable a user to freely input and edit a plurality of translated terms displayed on an image editing screen by adding letters (e.g., a term "sugar" to be converted to "sugarless" by adding "less"), or by partly deleting letters from the translated terms, there is the following problem. Namely, in case the user is not familiar with the language of the translated terms, the input work takes much time and, in addition, there is a possibility of committing a mistake in inputting (e.g., "sugar" may wrongly be inputted as "sugarress" instead of "sugarless"). Further, since such a mistake is hardly brought to the user's attention, the term in question is likely to be changed to a term which does not make sense due to wrong spelling, or to a term which bears a completely different meaning. If an arrangement is made, on the other hand, to prohibit the edition of the translated terms, it is not possible to delete translated terms of the language which is not required, or to change the layout (or arrangement) of the translated terms. As a result, the user suffers from inconvenience in that satisfactory printing result cannot be achieved.

SUMMARY

An advantage of the invention is to provide an image editing apparatus, an image editing method, a program, and a printing apparatus in which a plurality of translated terms of at least one term represented by a plurality of languages can be edited and inputted adequately and easily without wrongly changing them into a term, and the like, having no meaning.

According to one aspect of the invention, there is provided an image editing apparatus for editing on an image editing screen a printing image to be printed on a printing medium, the printing image being arranged by a plurality of translated terms of at least one term represented by a plurality of languages. The apparatus comprises: a translated-term memory device for storing therein plural sets of the plurality of translated terms; a selection device for selecting one set of the translated terms out of the plural sets of the translated terms; a display device for displaying on the image editing screen the selected one set of the translated terms as a printing block, where addition and deletion of a letter are prohibited, on a translated term-by-translated term basis; and a position designating device for designating an editing input position of the printing block on the image editing screen.

According to another aspect of the invention, there is provided an image editing method for editing on an image editing screen a printing image to be printed on a printing medium, the printing image being arranged by a plurality of translated terms of at least one term represented by a plurality of languages. The method comprises: selecting one set of the translated terms out of the plural sets of the translated terms; displaying on the image editing screen the selected one set of the translated terms as a printing block, where addition and deletion of a letter are prohibited, on a translated term-by-translated term basis; and designating an editing input position of the printing block on the image editing screen.

According to these configurations, the plurality of translated terms as selected are displayed on the image editing screen as a printing block where addition and deletion of a letter (i.e., edition on a letter-by-letter basis) are prohibited. Therefore, each translated term is not transformed, in the course of inputting and editing by the user, into a term which is meaningless (i.e., which makes no sense) or which has a different meaning. The printing block can then be subjected to editing work (decoration, pasting, deletion, and the like, as described hereinafter) and to new inputting work at an editing input position designated on the image editing screen. As a result, it is possible to adequately and easily execute editing input work of the plurality of translated terms represented by a plurality of languages without wrongly changing them into terms having no meaning, and the like.

It is preferable that a plurality of printing blocks be configured to be capable, on a printing block-by-printing block basis, of changing the font size, and of performing decoration thereon such as "highlighted letters" and "italicized letters." According to this configuration, the plurality of letter styles of each of the translated terms can be unified and also the letter style can be varied from one another among the plurality of translated terms, thereby enabling to form a variety of labels.

In the above-described image editing apparatus, it is preferable that the translated-term memory device store therein each set of the translated terms in correlation with a corresponding head word, and that the selection device comprises: a head word selection device for selecting an arbitrary head word out of the plurality of stored head words; and a readout device for reading out the plurality of translated terms corresponding to the selected head word from the translated-term memory device.

According to this configuration, one set of translated terms can be easily and appropriately selected with the head word serving as a clue (or key). As a head word, there can be used a word that is the same as one of the plurality of corresponding translated terms or a word which is represented by a language other than the plurality of corresponding translated languages.

It is preferable that the apparatus further comprise: a block memory device for storing therein one or more arbitrary printing blocks out of the plurality of printing blocks; and a pasting device for pasting the stored printing block on a block-by-block basis to a position based on the designated editing input position.

According to this configuration, the printing block can be pasted to the pasting position not partly but in its entity on a block-by-block basis. In this manner, the printing block will not be pasted partly. As a result, there is no possibility of pasting together meaningless terms or terms which are different in meaning from each other. Further, by pasting the printing block in its entity, translated terms which are otherwise troublesome in inputting one by one can be easily pasted.

It is preferable that the pasting device comprise a pasting position change device for changing the pasting position to one of a front end and a rear end of the printing block in case the editing input position is designated to a position between letters of the printing block.

According to this configuration, even in case where the editing input position is designated between letters of the printing block, the stored printing block can be prevented from being pasted to a position between letters of the printing block and, instead, can be pasted to either the front end or the rear end thereof. As a result, the printing block can be pasted without the possibility of inserting a printing block of the same or another language inside the printing block represented by a certain language. In other words, the printing block can adequately be pasted without the trouble of designating the editing input position to either the front end or the rear end of the printing block.

It is preferable that the pasting device comprise a pasting prohibition device for prohibiting the pasting of the stored printing block in case the editing input position is designated to a position between letters of the printing block.

According to this configuration, even in case the editing input position is designated to a position between letters of the printing block, the stored printing block can be prevented from being pasted to the position between letters of the printing block. Therefore, there is no possibility of inserting a printing block of the same or another language into the printing block represented by a certain language. As a result, a meaningless language is prevented from being formed.

It is preferable that the apparatus further comprise a deleting device for deleting, in case the editing input position is designated to a position in the printing block, the printing block in its entirety from among the plurality of printing blocks.

According to this configuration, the printing block in which the editing input position is located is deleted in its entirety. Therefore, there is no possibility that the translated terms are changed to terms having no meaning or terms having another meaning. As a result, in case there is contained in the plurality of translated terms some which are not required, or in case the plurality of translated terms are changed in layout or arrangement, the user can designate the editing input position in the printing block which is desired to be deleted. The printing block can thus be appropriately and easily deleted in its entirety to thereby execute the editing work.

It is preferable that the position designating device comprise: a cursor display device for displaying on the editing screen a cursor to indicate the editing input position; and a cursor moving device for moving the cursor on a letter-by-letter basis from a front end to a rear end of the printing block; and that the apparatus further comprise a preview-display device for preview-displaying a printing impression of the printing image on the same display screen as the image editing screen, the preview-display device displaying in a scrolled manner a range of the printing block corresponding to the position of the moving cursor.

According to this configuration, by moving the cursor, the editing input position can be designated and also the range of the printing block to be displayed for preview can be designated. As a result, the user can grasp the printing impression in correlation with the cursor position. In addition, irrespective of the length of the character string of the plurality of the translated terms, the entire printing impression can be displayed by scrolling, thereby improving the convenience of the user.

In this case, it is preferable that the display device display the printing block in a manner capable of visually confirming the prohibition of addition of a letter thereto and deletion of a letter therefrom.

According to this configuration, the user can easily recognize the fact that the printing block cannot be edited on a letter-by-letter basis.

According to another aspect of the invention, there is provided a computer readable medium having stored therein a program which causes a computer to perform each of the devices of the above-described image editing apparatus.

According to this configuration, there can be provided a program which can adequately and easily execute the editing input operation without wrongly changing the translated terms, which are each represented by a plurality of languages, into terms having no meaning.

According to still another aspect of the invention, there is provided a printing apparatus comprising: each of the devices of the above-described image editing apparatus; and a printing device for printing on the printing medium based on the printing image as edited by the image editing apparatus.

According to this configuration, the translated terms represented by a plurality of languages can be appropriately and easily edited by the editing input operation of each of the translated terms without wrongly changing them into terms having no meaning, and the like, and printed on a printing medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, a description will now be made about a tape printer (printing apparatus) to which the image editing apparatus of the invention is applied. In this tape printer, a printing image arranged by a plurality of translated terms which represent one term in a plurality of languages is edited on an image editing screen, printed on a printing tape (as an example of a printing medium), and is finally cut at a rear end of the printed tape, thereby forming a label (tape piece).

Figure 1:
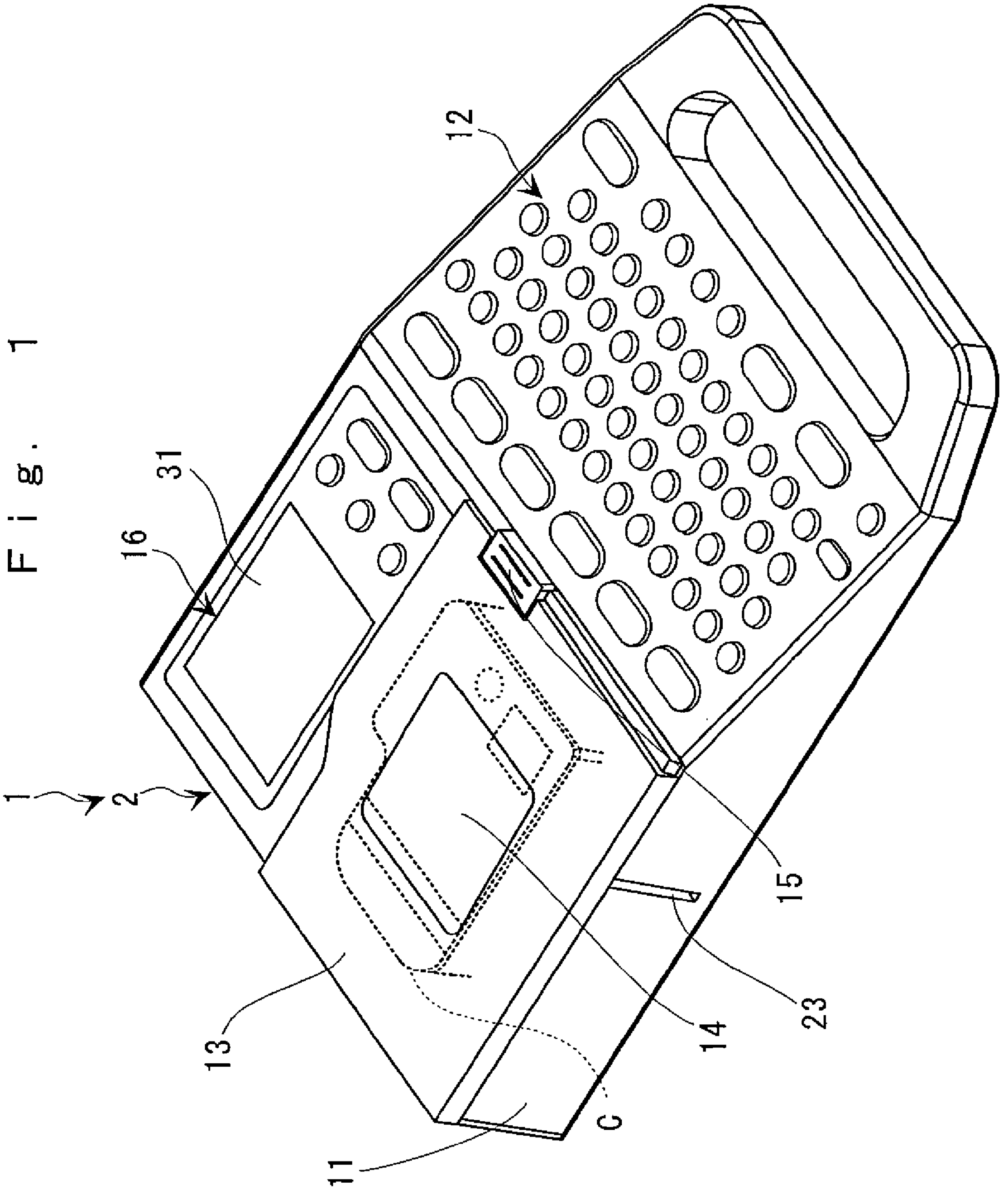
FIG. 1 is an external perspective view of a tape printer with an open-close lid kept closed according to an embodiment of the invention.
Figure 2:
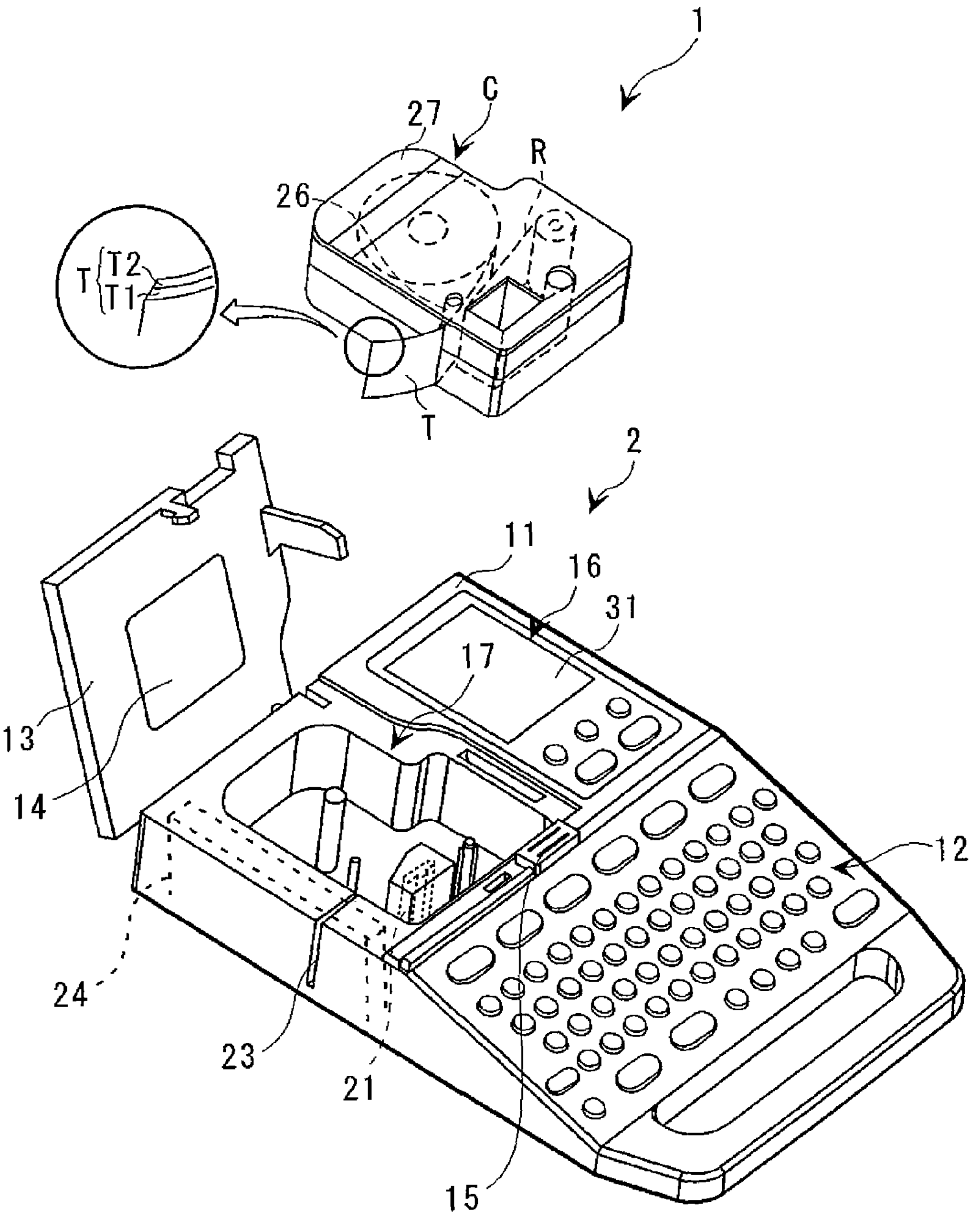
FIG. 2 is an external perspective view of the tape printer with the open-close lid left open.

As shown in FIGS. 1 and 2, the tape printer 1 is made up of: an apparatus main body 2 which performs printing on a printing tape T; and a tape cartridge C which houses therein the printing tape T and an ink ribbon R and is detachably mounted on the apparatus main body 2.

The apparatus main body 2 has an outer shell formed by an apparatus casing 11. On an upper surface of a front half area of the apparatus casing 11, there is disposed a keyboard 12 provided with various keys. On a left upper surface of a rear half area of the apparatus casing 11, there is provided an open/close lid 13 whose upper surface has formed therein a discrimination hole 14 for use in visually checking whether the tape cartridge C has been mounted or not. On a front side (i.e., on a side of an operator) of the open/close lid 13, there is provided an open/close button 15 for opening the open/close lid 13. On a right upper surface of the rear half area of the apparatus casing 11, there is formed a rectangular display 16 which displays a result of input from the keyboard 12.

Under the open/close lid 13 to be opened by pressing the open/close button 15, there is formed in a recessed manner a cartridge mounting section 17 for mounting therein the tape cartridge C. At the corner of the cartridge mounting section 17, there is disposed a tape identifying sensor 18 (see FIG. 3) which is made up of a plurality of micro-switches, and the like.

The cartridge mounting section 17 has disposed therein a thermal head 21 which has a heating element. When the tape cartridge C is mounted in position, the thermal head 21 comes into contact with a platen roller 26 which is provided in the tape cartridge C, with the printing tape T and the ink ribbon R being sandwiched in between, thereby attaining a state of being ready for printing. While feeding (or paying out) the printing tape T and the ink ribbon R by means of a power transmission mechanism (not shown) made up of a feed motor 22 (see FIG. 3), gear trains, and the like, printing is performed onto the printing tape T (i.e., thermal transfer of ink from the ink ribbon R to the printing tape T).

On the left side area of the apparatus casing 11, there is formed a tape ejecting slot 23 which brings the cartridge mounting section 17 and the outside of the apparatus into communication with each other. In close proximity to this tape ejecting slot 23, the apparatus casing 11 has built therein a cutter unit 24 which is driven by a cutter motor 25 (see FIG. 3). The printing tape T that has finished printing thereon is cut at the rear end thereof by this cutter unit 24, thereby forming a tape piece. Although not shown, the cutter unit 24 is provided with a full cutter to cut both (i.e., full-cut) a recording tape T1 and a release tape T2 (to be described in detail hereinafter) of the printing tape T, and a half cutter to cut (i.e., to half-cut) only the recording tape T1.

Although not shown, on the right side area of the apparatus casing 11, there are formed a power supply port for supplying electric power, and a connector for connection of the tape printer 1 to an external apparatus such as a personal computer (not shown). In this configuration, the tape printer 1 can print on the printing tape T a printing image prepared based on the input data from its own keyboard 12. It can also print a printing image by obtaining the same from a personal computer, and the like. Although not shown, the apparatus casing 11 has mounted therein a circuit board which constitutes a control unit 105 (described hereinafter) for executing overall control over the tape printer 1.

The printing tape T is made up of the recording tape T1 whose rear surface is coated with an adhesive, and the release (peel-off) tape T2 adhered to the recording tape T1 by means of the adhesive. By releasing (or peeling off) the release tape T2 from a tape piece of the printing tape T that has been cut off after printing, the user can adhere the recording tape T1 to an object of adhesion (i.e., the object to which the recording tape T1 is to be adhered in actual use).

A cartridge case 27 has formed on a rear surface thereof a plurality of small detection holes (not shown). These detection holes are identified by the above-described tape identifying sensor 18 so that the kind of the printing tape T (e.g., the tape width) can be identified.

The display 16 is constituted by a dot matrix type of liquid crystal display device, and has a display screen 31 for displaying thereon display image data, and a plurality of indicators (not shown) for displaying various setting states, and the like. The display 16 is used by the user at the time of inputting data from the keyboard 12 to thereby prepare and edit the printing image (printing data) and visually identity the result of inputting, and the like.

The keyboard 12 has arranged therein: character key groups inclusive of Japanese kana key group, numeral key group, alphabet key group, and the like; function key groups for designating various processing; and the like. It is so arranged, by means of conversion keys (described hereinafter) of the character key groups and the function key groups, that mainly characters such as hiragana, katakana, kanji, numerals, and alphabets can be inputted from the keyboard 12.

The function key groups include: a switch key; a print key for commanding the printing; a conversion key for converting the characters, e.g., conversion from Japanese kana letters to kanji (Chinese characters) letters, and the like; a selection key for giving command to fix the characters as converted by the conversion key, to start a new line, and to select in the selection screen; a cancellation key for canceling various operations; a deletion key for deleting various operations and deleting characters, depending on necessity, after having once fixed; a restoration key for restoring (pasting) the characters once deleted by the deletion key; four cursor keys for moving a cursor 142, described hereinafter, (see FIG. 4A, etc.) in the horizontal and vertical directions; and the like. These keys may be provided independently for respective input keys or may be provided in a smaller number for use in combination with the shift key, and the like. The keyboard 12 is used to input various commands and data into the control unit 105.

Figure 3:
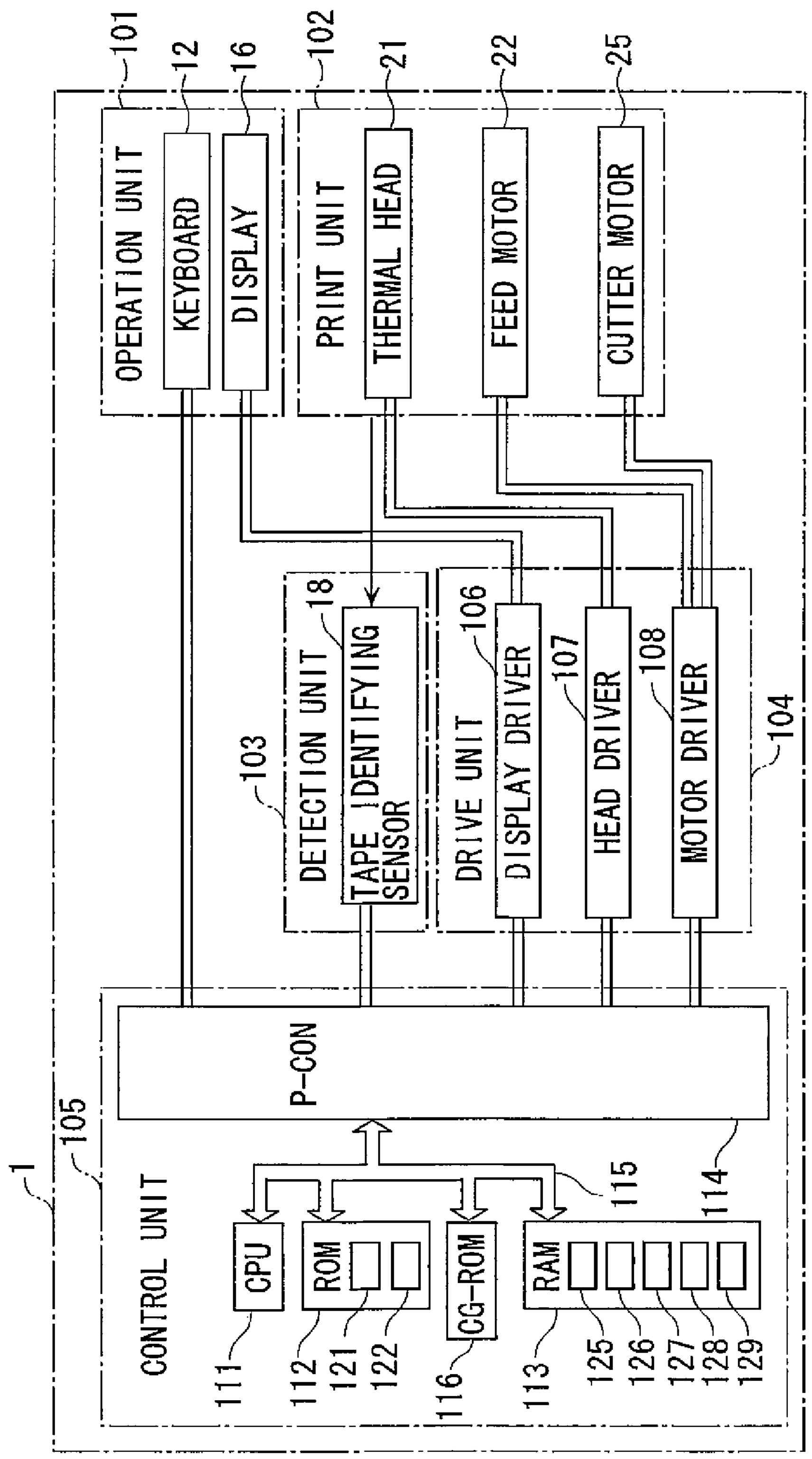
FIG. 3 is a block diagram of the control system of the tape printer.

With reference to FIG. 3, a description will be made about the constitution of the tape printer 1. The tape printer 1 is made up of: an operation unit 101 which has the keyboard 12 and the display 16 to thereby control the user interface such as inputting of the letter information by the user and displaying of various information, and the like; a print unit 102 which has the thermal head 21, the feed motor 22, and the cutter motor 25 to thereby perform the printing; a detection unit 103 which has the various sensors such as the tape identifying sensor 18, and the like to thereby perform various detections; a drive unit 104 which has a display driver 106, a head driver 107, and a motor driver 108 to thereby drive each of the units; and a control unit 105 which is connected to the respective units to thereby control the entire tape printer 1. Based on input signals from the keyboard 12, the control unit 105 controls the display 16 and the print unit 102 through the drive unit 104.

The control unit 105 is provided with a CPU 111, a ROM 112, a character generator ROM (CG-ROM) 116, a RAM

113, and a peripheral controller (P-CON) 114 which are connected to one another through a bus 115.

The ROM 112 has a control program region 121 which stores therein a control program to be processed by the CPU 111; a region which stores therein translated terms and head words to be described in detail hereinafter; and a control data region 122 which stores therein a kana-kanji conversion table (dictionary), letter decoration table for changing character strings into decorated letters such as "italicized format," "highlighted format," and the like. The CG-ROM 116 stores therein font data of characters such as letters, marks (or symbols), figures, and the like, which are prepared in the tape printer 1. When a code data to specify the character is given, the corresponding font data is outputted.

The RAM 113 is used as a working region for control processing and is provided with various flag register groups 125, a text data region 126 which stores therein the text data inputted by the user from the keyboard 12, a click board store region 127 which stores (temporarily keeps) therein character strings which are made the object of pasting in the pasting operation to be described hereinafter, a display image data region 128 which stores therein display image data of the display screen 31, a printing buffer 129 which is the region for preparing printing images to be printed on the printing tape T, and the like. Further, the RAM 113 is kept constantly supplied with electric power by a backup circuit (not shown) so as to maintain the stored data.

The P-CON 114 has built therein a logic circuit constituted by a gate array, a custom LSI, and the like, in order to supplement the function of the CPU 111 and also handle the interface signals with the peripheral circuits. The P-CON 114 is connected to the keyboard 12 and the various sensors so that the various commands and input data from the keyboard 12 as well as the various detected signals, and the like, are outputted to the CPU 111 and the RAM 113 through the bus 115 as they are or with due processing. Further, the data and control signals outputted from the CPU 111, and the like, through the bus 115 are outputted to the drive unit 104 as they are or with due processing.

In the drive unit 104, the display driver 106 controls the display screen 31 of the display 16 according to the control signal to be outputted from the control unit 105. Similarly, the head driver 107 drives the thermal head 21 according to the command from the control unit 105. The motor driver 108 drives the feed motor 22 according to the command from the control unit 105 to thereby control the feed operation of the printing tape T and the ink ribbon R, and also drives the cutter motor 25 to thereby control the cutting operation.

In the control system according to the above-described configuration, the CPU 111 of the control unit 105 executes the following operations. Namely, according to the control program within the ROM 112, various commands, various data, and the like, from the keyboard 12, and the like, are inputted through the P-CON 114. The font data from the CG-ROM 116, various data, and the like, within the RAM 113, and the like, are processed. A control signal is then outputted to the drive unit 104 through the P-CON 114. According to these operations, there are executed the display control of the display image 31 and the preparation and edition of the printing image, and the control of the thermal head 21, and the like, to thereby execute an overall control over the tape printer 1 such as printing on the printing tape T under predetermined conditions.

In the tape printer 1 of this embodiment, the image editing apparatus of the invention is mainly materialized by the operation unit 101 and the control unit 105. With reference to FIGS. 4A and 4B to 9A and 9B, a description will now be made about the procedures to form a label, together with the characteristic operations thereof.

It is to be noted that, in case one label is formed, this tape printer 1 is capable of printing by dividing into a plurality of sections as seen in the direction of the tape length and that form setting such as portrait writing/landscape writing can be made on a paragraph-by-paragraph basis. Further, in each paragraph, a character string made up of one or more letters (characters) can be printed in one or a plurality of lines as seen in the widthwise direction of the printing tape. The maximum number of lines that can be printed varies with the tape width of the mounted tape cartridge C. An explanation will be made here on condition that printing can be made of four lines or more unless otherwise noted.

First, with the switching on, the tape printer 1 is started in a state ready for inputting with keys. The tape printer 1 has a plurality of modes: such as input/editing mode for inputting and editing arbitrary character strings; fixed foreign language mode for inputting a plurality of translated terms represented by a plurality of languages as described hereinafter; and the like. By the operation of predetermined key or keys, each of the modes is called up, and printing data is respectively inputted from the input screen of the respective modes. At the time of starting up, the tape printer 1 is in the input/editing mode.

Figure 4A:
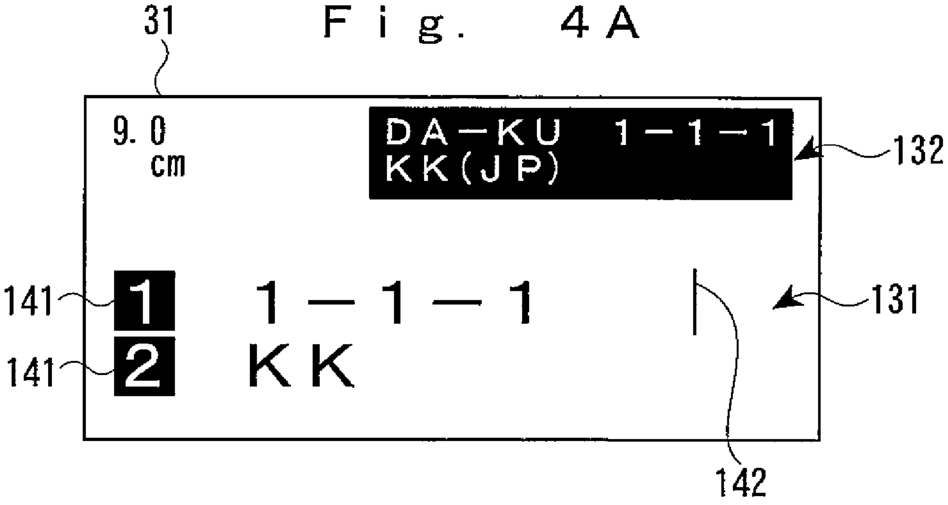
FIG. 4A is a display screen in input editing mode of the tape printer.
Figure 4B:
FIG. 4B is an example of a label formed by the tape printer.

As shown in FIG. 4A, in the input/editing mode, the lower half area of the display screen 31 serves as the image editing region 131 for inputting and editing the printing image, and the right upper half area thereof serves as the preview region 132 for preview-displaying (i.e., displaying for the purpose of previewing) a printing impression (or printing conception) of the printing image. The length of a label corresponding to the printing image under preparation and editing is displayed in the left upper half area thereof.

When an arbitrary character string is inputted while executing line feeding and paragraph feeding through the keyboard 12, the inputted character string is displayed in the image editing region 131, e.g., as Tokyo-to, Chiyoda-ku, 1-chome 1-1 (shown in FIG. 4B as "Tokyo Chiyoda 1-1-1" for short) on the first line and as Tokyo ABC Kabushiki Kaisha (shown in FIGS. 4A and 4B as Tokyo ABC KK for short) on the second line. There are also displayed a line head mark 141 indicating in reverse video (white character in black background) on which line number each character string lies, and a cursor 142 indicating the editing input position on the display screen 31.

In case the character string is long, the image editing region 131 is displayed only partly. However, if the cursor 142 is appropriately moved by scrolling in the left-and-right direction by a unit of a letter (i.e., one letter at a time, or on a letter-by-letter basis) within the character string, the indicating region is moved to thereby move the editing and inputting position. Similarly, it is so arranged that the area corresponding, e.g., to three lines can be displayed, but by means of scrolling in the up-and-down direction, the other lines can also be displayed.

In the preview region 132, the printing impression of the printing image that has been inputted and edited in the image editing region 131 is preview-displayed (i.e., displayed for the purpose of previewing). In this preview-region 132, in case the character string is long, it is also arranged that only the range corresponding to the position of the cursor 142 in the image editing region 131 is displayed and that, accompanied by the movement of the cursor 142, the range corresponding to the position of the cursor 142 is displayed in a scrolled manner. In other words, the cursor 142 indicates the position of the editing and inputting in the image editing region 131 and also indicates the display range in the preview region 132. By moving the cursor 142, it is so arranged that the position of the editing and inputting and the display range can be arranged.

As the operation of inputting character string into the image editing region 131, it is possible to input one letter at a time through the letter key group of the keyboard 12, to paste characters once deleted by the deletion key through the restoration key, and to input translated terms from the fixed foreign language mode (details will be described hereinafter).

Then, when the inputting and editing of the character string has been finished, the user confirms the printing impression in the preview region 132 and depresses the printing key. Then, the printing image of the character string is prepared and a tape piece (label) on which the printing image is printed on the printing tape T can be achieved (see FIG. 4B).

A description will now be made about the inputting operation for translated terms from the fixed foreign language mode. It is so arranged in this tape printer 1 that, in the fixed foreign language mode, by selecting one set of four translated terms out of plural sets of four translated terms, the selected four translated terms can be inputted into the image editing region 131.

The tape printer 1 has stored, in the ROM 112 of the control unit 105, plural sets of four translated terms representing at least one term such as "hijokaidan (emergency stairways)," "hijoguchi (emergency exit)," "hijoberu (emergency bell)," "hijoberu koshou (emergency bell breakdown)," and the like, in four languages of Japanese, English, Chinese and Korean, respectively. Further, each set of the translated terms is stored in correlation with a corresponding head word (or entry word). In the example of "hijoguchi," there are stored a translated term represented by Japanese, a translated term represented by English, a translated term represented by Chinese, a translated term represented by Korean, as well as the corresponding head word of "hijoguchi." As a head word, there may be used one that is identical to a single translated term out of the four translated terms, or one that is represented by a language (e.g., French) other than the plurality of languages corresponding to the plurality of translated terms.

The translated term represented by both Japanese (kanji characters, and the like) and English (alphabets, and the like) can be inputted through the letter key group of the keyboard 12. However, the translated term represented by both Chinese (simplified letter style, and the like) and in Korean (Hangul alphabets, and the like) may be inputted (obtained) only in the fixed foreign language mode and cannot be inputted from the letter key group. The language to represent the translated terms may also be other languages such as French and Arabic. It may be appropriately changed depending on the official language of the country and region in which the tape printer 1 is used. The number of languages and their combination can also be arbitrarily determined.

Regarding predetermined sets of translated terms out of the plural sets of the translated terms, there are stored in the ROM 112 printing figure marks which are related thereto, in correlation with the four translated terms. For example, as to the translated term "hijoguchi," there is stored a figure mark showing an emergency exit (see, e.g., FIG. 6A) together with the above-described four translated terms.

Figure 5A:
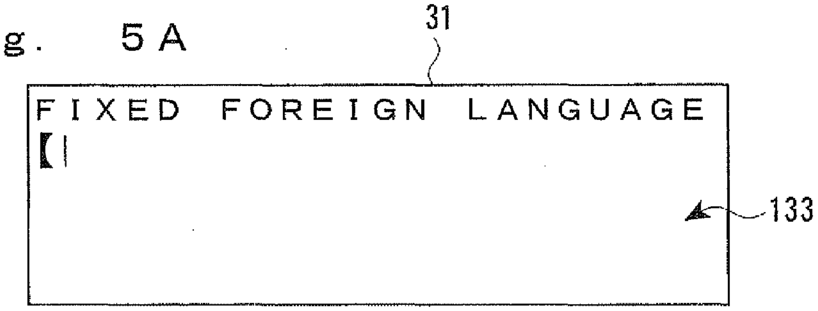
FIGS. 5A to 5D are display screens in a fixed foreign language mode of the tape printer.
Figure 5B:
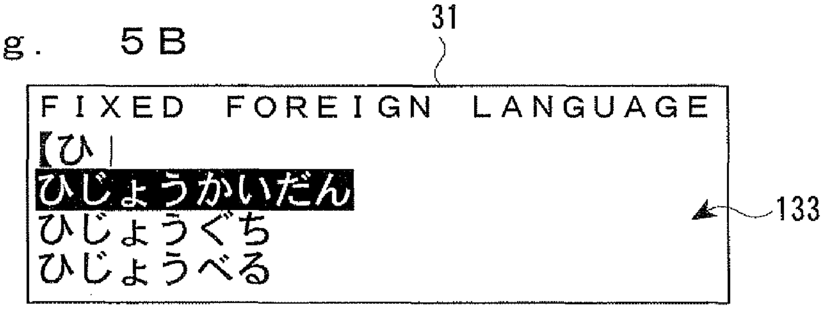
Figure 5C:
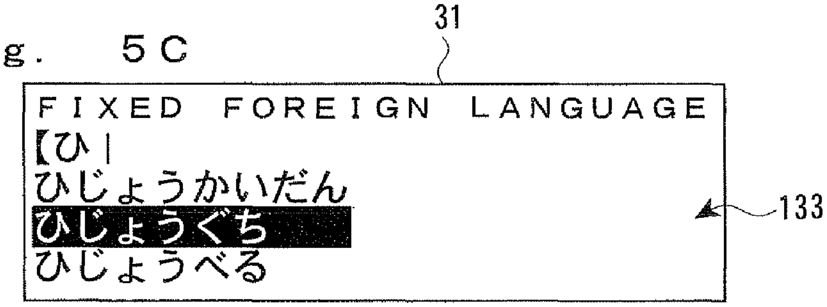
Figure 5D:
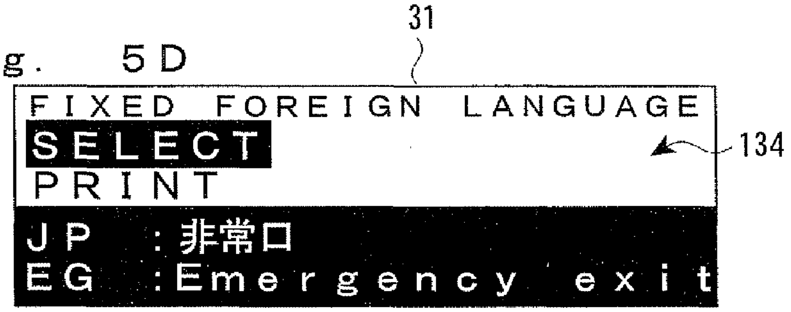
Figure 6A:
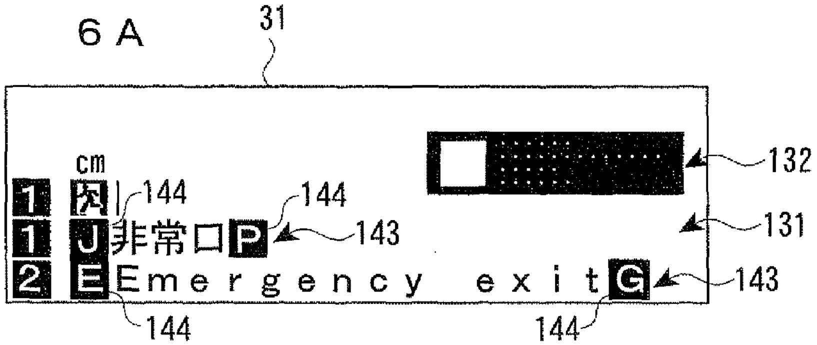
FIG. 6A is a layout in which a plurality of translated terms are displayed on the display screen which has been switched from the fixed foreign language mode to the input editing mode.
Figure 6B:
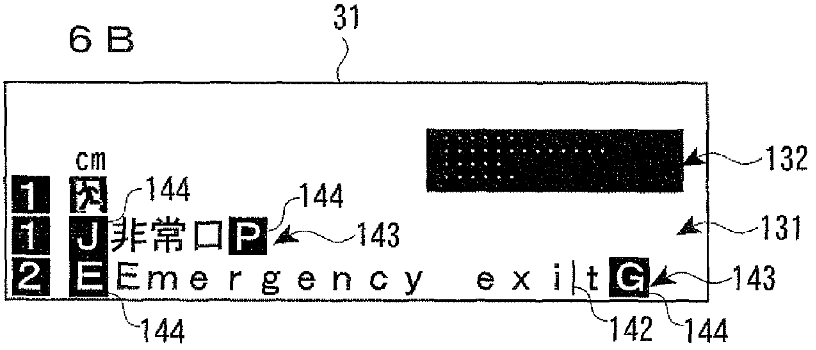
FIG. 6B is a layout to explain that the display range moves on the preview screen by moving, on the image editing screen, the cursor within the printing block.

As shown in FIGS. 5A to 5D, when switching is made by the operation of predetermined keys from the input editing mode to the fixed foreign language mode, there is displayed a searching screen 133 on the display screen 31 (see FIG. 5A). When "hi" (of hijoguchi) is inputted from the keyboard 12 in the searching screen 133, there are listed up those which start with the term "hi" out of the plurality of head words (see FIG. 5B). In other words, based on the inputted character string, the head words which the user is likely to select are predicted, and corresponding head words are listed up. In this case, if the inputted character string (e.g., "hijogumi" which does not make sense in Japanese) does not have a corresponding translated term, there is displayed a message to that effect.

Instead of depending on the input prediction as noted above, there may be employed a way in which all of the head words are displayed in the order of the Japanese kana syllabary and selected by means of scroll displaying. Moreover, there may be employed a way in which four translated terms per group are all displayed regardless of a head word and an arbitrary group of translated terms is selected.

Once the "hijoguchi" is selected out of those listed up (see FIG. 5C), there will be read out the corresponding four translated terms from the ROM 112. A foreign language call up confirmation screen 134 is displayed on the display screen 31, and two out of the four translated terms corresponding to "hijoguchi" are displayed on the lower half of the display screen 31. The remaining two can also be displayed by scrolling in the top-and-bottom direction. On the upper half of the display screen 31, there are displayed "selection" and "print" (see FIG. 5D).

Once the "selection" key is depressed upon confirmation of the four translated terms displayed on the foreign language call up confirmation screen 134, inputting of the four translated terms and the printing figure mark are executed. Namely, the mode is changed from the fixed foreign language mode to the input editing mode, and the above are displayed in the image editing region 131 (see FIG. 6A). In other words, the printing figure mark is displayed on the first paragraph, a translated term into Japanese is displayed on the first line of the second paragraph, and a translated term into English is displayed on the second line of the second paragraph. By scrolling in the top-and-bottom direction, a translated term into Chinese is displayed on the third line and a translated term into Korean is displayed on the fourth line of the second paragraph, respectively. In case four translated terms having set no related printing figure mark are selected in the searching 133, the printing figure mark is, of course, not displayed but only the four translated terms are displayed.

Each of the translated terms is displayed in the image editing region 131 as a printing block 143 where it is impossible to perform addition of letters to the character string constituting each of the translated terms (e.g., "hijoguchi" to "hijodeguchi" by adding "de") and deletion of part of the letters from the character string (e.g., "hijoguchi" to "higuchi" by deleting "jo"). Each of the printing blocks 143 is provided on both front end and rear end with block marks 144 and 144 to indicate the name of the language and also to help visual confirmation that the addition of letters and deletion of letters are prohibited. In the examples in FIGS. 6A and 6B as well as others, the block marks are displayed in the following abbreviated manner, i.e., "J" in the front end and "P" in the rear end for "Japanese" and "E" in the front end and "G" in the rear end for "English" due to limited space available therein. Of course, it is possible to input arbitrary character string(s) before and after each printing block 143 from the keyboard 12.

As described above, it is impossible to add or partly delete letter(s) to and from the printing block 143. Therefore, for the purpose of inputting and editing, it is not necessary to move the cursor 142 on a letter-by-letter basis (i.e., by the unit of each letter) within the printing block 143. Of course, the cursor 142 is arranged to be movable from the front end to the rear end of each printing block 143 on a letter-by-letter basis so that the display range in the preview region 132 can be moved by moving the cursor 142 (see FIG. 6B). According to this configuration, the user can grasp the printing impression in correlation with the cursor position. In addition, since the entire printing impression can be displayed by scrolling irrespective of the length of the character string of a plurality of translated terms, the convenience of the user can be improved.

When the printing key is depressed upon confirmation of the printing impression in the preview region 132, there is formed a printing image for printing on the printing tape T the four translated terms and the printing figure mark. The printing figure mark (figure mark of emergency exit) is printed on the first paragraph. The four translated terms are printed in correlation with one another on the second paragraph. Thus, there is formed a printing tape T (label) in which a Japanese translated term ("hijoguchi" in Japanese) is printed on the first line, a translated term in English (emergency exit) is printed on the second line, a translated term in Chinese is printed on the third line, and a translated term in Korean is printed on the fourth line, respectively (see FIG. 7A).

Figure 7A:
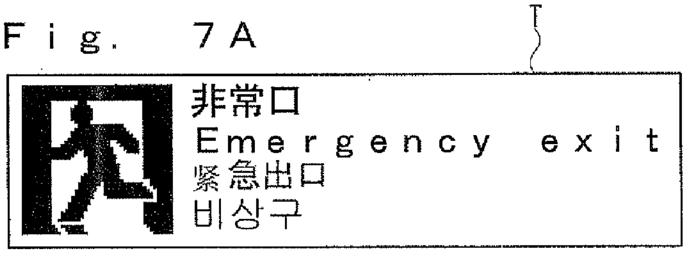
FIGS. 7A to 7D are examples of printing tape in which a plurality of translated terms and a printing figure mark are printed by the tape printer in correlation with each other.

The way of printing the four translated terms in correlation with one another need not be limited to the example shown in FIG. 7A, but the order of listing the four languages is arbitrary. Alternatively, they may be printed in two lines by dividing the same into two (Japanese and English on the first line, and Chinese and Korean on the second line). Otherwise, all of the four translated terms may be printed in a single line. It may also be so arranged that full cutting or half cutting is performed on the printing tape T at a position between the paragraphs (i.e., between the printing figure mark and the four translated terms).

Figure 7B:
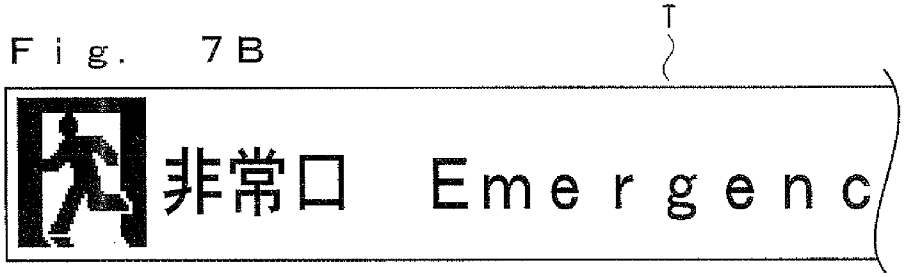
Figure 7C:
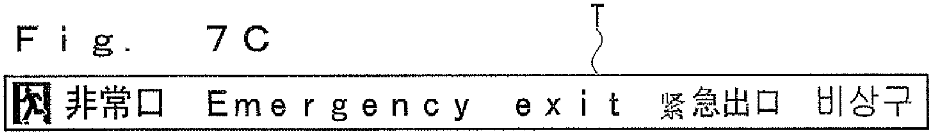

When "printing" is selected on the foreign language call up confirmation screen 134, on the other hand, the printing figure mark, and the translated terms in Japanese, English, Chinese and Korean are printed in correlation with one another in the order mentioned along the longitudinal direction of the printing tape T (see FIG. 7B). In this case, too, it may be so arranged that full cutting or half-cutting is performed in a position between the printing figure mark and the Japanese translated term or between the adjoining translated terms.

In the printing block 143, addition of letters and partial deletion of letters are prohibited as described above. It is, however, possible to delete the printing block 143 in its entirety and to paste (cut and paste) the deleted printing block 143 on a printing block-by-printing block basis.

Figure 8A:
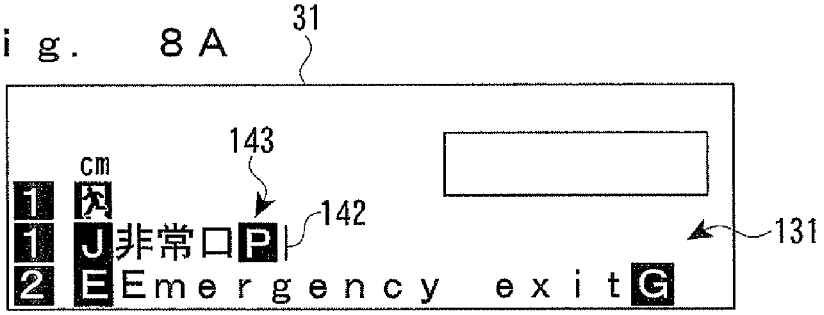
FIGS. 8A to 8D are display screens showing the processing of deleting and pasting a printing block on the display screen of the tape printer.
Figure 8B:
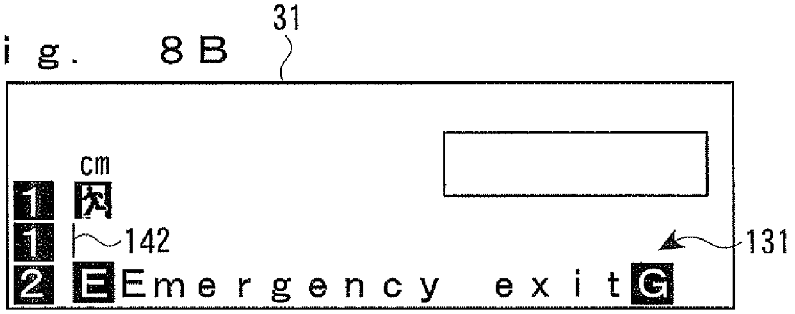
Figure 8C:
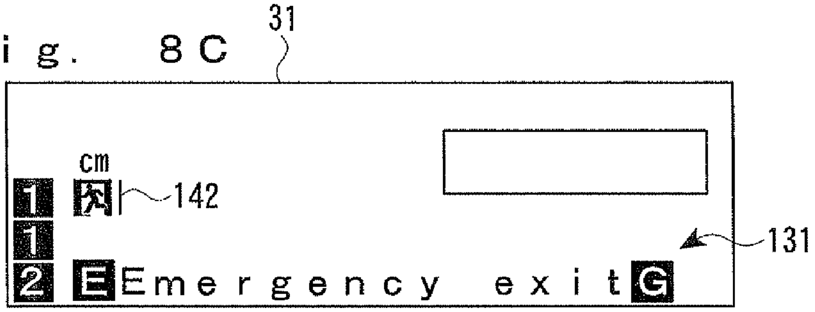
Figure 8D:
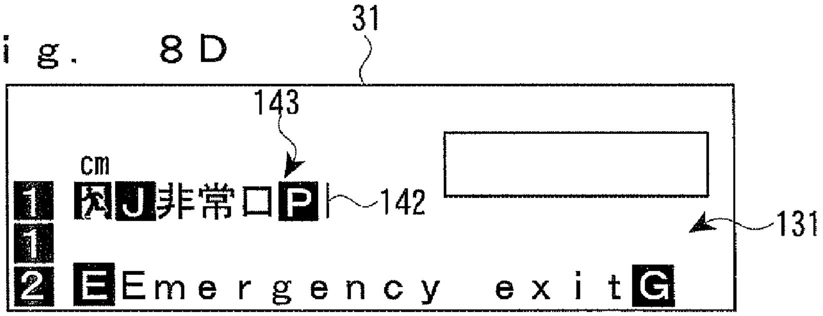

In concrete, if the deletion key is depressed when the cursor 142 is in a position on the printing block 143 of the Japanese term (e.g., on the rear end of the printing block 143) in the image editing region 131 (see FIG. 8A), the Japanese printing block 143 is deleted in its entirety (see FIG. 8B). In this manner, since the printing block 143 is not partly deleted, there is no possibility that the translated term is changed to a term having no meaning at all (e.g., "hijoguchi" (emergency exit in Japanese) changed to "higuchi" (making no sense in Japanese by deletion of "jo")) or that the translated term is changed to another meaning (e.g., "hjoguchi" (emergency exit) to "hijo" (emergent, or very)). Instead, the translated term can be deleted in its entirety. If the printing key is depressed in this state, the three translated terms are printed. In other words, printing is made of English on the first line, Chinese on the second line, and Korean on the third line of the second paragraph (or else, the first line may be left blank and the three translated terms may be printed on the second line and downward). Therefore, when a translated term which is not required is contained in the four translated terms, or when the four translated terms are changed in their displaying layout or arrangement (details to be described hereinafter), the user can appropriately and easily delete the entire printing block to thereby execute editing work.

It is so arranged that the deleted Japanese printing block 143 is stored in the clip board memory region 127 within the RAM 113. Therefore, after having depressed the deletion key, the cursor 142 is moved to the rear end of the printing figure mark (designate the editing input position) (see FIG. 8C), and the restoration key is depressed. The Japanese printing block 143 can thus be pasted to the rear end of the printing figure mark (see FIG. 8D) on a block-by-block basis. Further, as to the English printing block 143, the Chinese printing block 143 and the Korean printing block 143, pasting can similarly be made on a block-by-block basis.

According to the above configuration, since there is no possibility that a part (e.g., "emer") of the printing block 143 is pasted, the term which does not make sense or which has another meaning can be prevented from getting pasted. At the same time, by pasting the entire printing block 143, the translated terms which are time-consuming if inputted on a letter-by-letter basis can be easily pasted. In addition, by pasting the printing blocks 143 of Chinese language and Korean language which can be obtained only from the fixed foreign language mode, it becomes possible to input the translated terms in Chinese language and Korean language which cannot be inputted from the keyboard 12. It is therefore particularly useful in inputting again after once deleting the translated terms in Chinese language and Korean language or in inputting in a plurality of pieces.

By repeating the cutting and pasting operations, the printing figure mark and the four translated terms can be arranged or laid out on the same line (in the same paragraph). According to this configuration, even in case the tape width of the mounted tape cartridge C is small, so that printing cannot be made in as many as four lines, the printing figure mark and the four translated terms can be printed on the same line (see FIG. 7C).

It may be so arranged that two or more printing blocks 143 are stored to thereby paste them simultaneously on a block-by-block basis. For example, after deleting and storing the Japanese-language block 143 on the first line and the English-language printing block 143 on the second line by a predetermined key operation, the Japanese-language printing block 143 and the English-language printing block 143 may be pasted, on a block-by-block basis, to the position following the Chinese-language printing block 143.

Figure 9A:
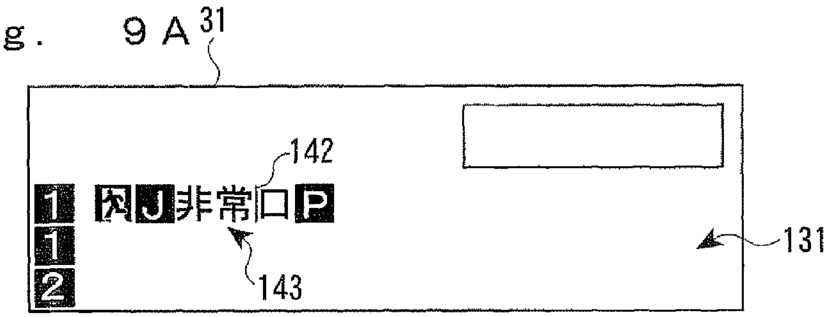
FIGS. 9A and 9B are display screens in which pasting operation is executed while the cursor is located between letters of a printing block.
Figure 9B:
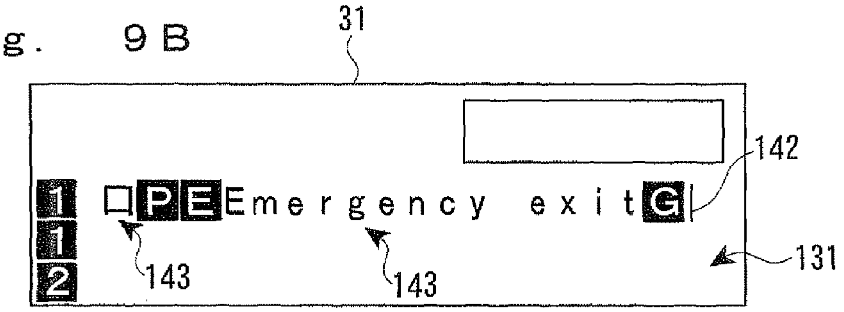

Further, when the pasting operation (depression of restoration key) of the English-language printing block 143 is executed when the cursor 142 is located between letters of the Japanese-language printing block 143 as shown in FIG. 9A, the pasting position is changed from the cursor position to the rear end of the Japanese-language printing block 143. Namely, it is so arranged that the English-language printing block 143 is pasted to the rear end of the Japanese-language printing block 143, instead of being pasted to the position between letters thereof.

According to this configuration, even in case the cursor 142 is set between letters of the printing block 143, the stored printing block 143 can be prevented from being pasted to a position between letters of the printing block 143 and, instead, can be pasted to the rear end thereof. Therefore, the pasting of the printing block 143 can be executed without the possibility that the printing block 143 of the same or another language is inserted (mixed) into the printing block 143 of a certain language. In other words, the pasting of the printing block 143 can properly be made without taking the trouble of setting the cursor position to either the front end or the rear end of the printing block 143. In case the cursor 142 is located in a position between letters of a printing block 143, the printing block may alternatively be pasted to the front end or, without pasting, an error message (e.g., displaying of alarm message) may be made, instead.

Figure 7D:

Further, in the image editing region 131, it is possible to execute, on a printing block-by-printing block basis, changes to the font sizes, decoration in "highlighted letter," "italicized letter," and the like. FIG. 7D is a printing tape T having printed thereon a printing image which is formed by increasing the font size of the Japanese-language printing block 143 and decreasing the font sizes of the printing blocks in the other three languages. According to this configuration, it is possible to unify the letter style of the plurality of translated terms and also to vary the style among the four translated terms. As a result, there can be formed labels rich in variety.

As described hereinabove, according to the tape printer 1 of the invention, the translated terms representing at least one term in four languages are subjected to editing and input work such as pasting of each translated term, and the like, without wrongly changing them into terms having no meaning, and the like. The printing image thus obtained can be appropriately and easily edited to be printed on the printing tape T.

Further, it is also possible to provide each function of the tape printer 1 in the form of a program. The program can be made available in a form stored in a recording medium such as a CD-ROM, and the like.

What is claimed is:

1. A tape printing apparatus for editing on an image editing screen a printing image to be printed on a printing medium, the printing image being arranged by a plurality of translated terms of at least one term represented by a plurality of languages, the apparatus comprising:

- an input device for inputting a term in one language;
- a translated-term memory device for storing therein plural sets of the plurality of translated terms, wherein a portion of the translated terms cannot be inputted by the input device;
- a selection device for selecting one set of the translated terms out of the plural sets of the translated terms, wherein the term in one language input by the input device is included in the one language in the one set of the translated terms selected by the selection device;
- a display device for displaying on the image editing screen the selected one set of the translated terms as a printing block, where addition and deletion of a letter are prohibited, on a translated term-by-translated term basis; and
- a position designating device for designating an editing input position of the printing block on the image editing screen.

2. The apparatus according to claim 1, wherein the translated-term memory device stores therein each set of the translated terms in correlation with a corresponding head word, and wherein the selection device comprises:

- a head word selection device for selecting an arbitrary head word out of the plurality of stored head words; and
- a readout device for reading out the plurality of translated terms corresponding to the selected head word from the translated-term memory device.

3. The apparatus according to claim 1, further comprising:

- a block memory device for storing therein one or more arbitrary printing blocks out of the plurality of printing blocks; and
- a pasting device for pasting the stored printing block on a block-by-block basis to a position based on the designated editing input position.

4. The apparatus according to claim 3, wherein the pasting device comprises a pasting position change device for changing the pasting position to one of a front end and a rear end of the printing block in case the editing input position is designated to a position between letters of the printing block.

5. The apparatus according to claim 3, wherein the pasting device comprises a pasting prohibition device for prohibiting the pasting of the stored printing block in case the editing input position is designated to a position between letters of the printing block.

6. The apparatus according to claim 1, further comprising a deleting device for deleting, in case the editing input position is designated to a position in the printing block, the printing block in its entirety from among the plurality of printing blocks.

7. The apparatus according to claim 1, wherein the position designating device comprises: a cursor display device for displaying on the editing screen a cursor to indicate the editing input position; and a cursor moving device for moving the cursor on a letter-by-letter basis from a front end to a rear end of the printing block;

- wherein the apparatus further comprises a preview-display device for preview-displaying a printing impression of the printing image on the same display screen as the image editing screen, the preview-display device displaying in a scrolled manner a range of the printing block corresponding to the position of the moving cursor.

8. The apparatus according to claim 1, wherein the display device displays the printing block in a manner capable of visually confirming the prohibition of addition of a letter thereto and deletion of a letter therefrom.

9. A tape printing method in a tape printing apparatus for editing on an image editing screen a printing image to be printed on a printing medium, the printing image being arranged by a plurality of translated terms of at least one term represented by a plurality of languages, the method comprising:

- inputting a term in one language
- selecting one set of the translated terms out of the plural sets of the translated terms previously stored, wherein a portion of the translated terms cannot be inputted, wherein the inputted term in one language is included in the one language in the selected one set of the translated terms;
- displaying on the image editing screen the selected one set of the translated terms as a printing block, where addition and deletion of a letter are prohibited, on a translated term-by-translated term basis; and
- designating an editing input position of the printing block on the image editing screen.

10. A printing apparatus comprising:

- each of the devices of the tape printing apparatus according to claim 1; and
- a printing device for printing on the printing medium based on the printing image as edited by the tape printing apparatus.

11. The apparatus according to claim 1, wherein the printing block includes a pair of block marks which indicates a name of a language corresponding to the translated term at a front end and a rear end of the translated term.

12. The method according to claim 9, wherein the printing block includes a pair of block marks which indicates a name of a language corresponding to the translated term at a front end and a rear end of the translated term.

* * * * *